Figure 1:
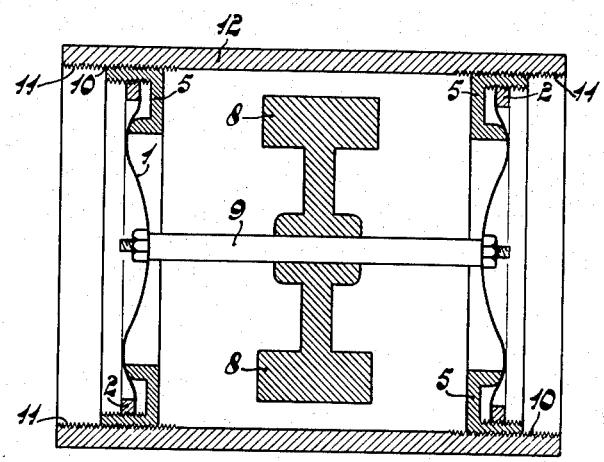

Sept. 21, 1954  C. VON BASEL  2,689,723
LINEAR TYPE ACCELERATION SENSING DEVICE
HAVING AN OSCILLATORY DIAPHRAGM
Filed Aug. 22, 1951

INVENTOR
CARL VON BASEL
BY
AGENT

Patented Sept. 21, 1954

2,689,723

UNITED STATES PATENT OFFICE 2,689,723

LINEAR TYPE ACCELERATION SENSING DEVICE HAVING AN OSCILLATORY DIAPHRAGM

Carl von Basel, Fribourg, Switzerland

Application August 22, 1951, Serial No. 243,138

Claims priority, application Switzerland August 25, 1950

5 Claims. (Cl. 264—1)

The invention relates to a sensing device, and more particularly to a linear type acceleration sensing device having an oscillatory diaphragm.

It is an object of the invention to provide a sensing device which has a high sensitivity.

It is another object of the present invention to provide a sensing device having a definite natural frequency.

Other objects and advantages of the present invention will become apparent from the following detailed description thereof when read in conjunction with the accompanying drawing showing, by way of example, two embodiments of the invention.

Figure 2:
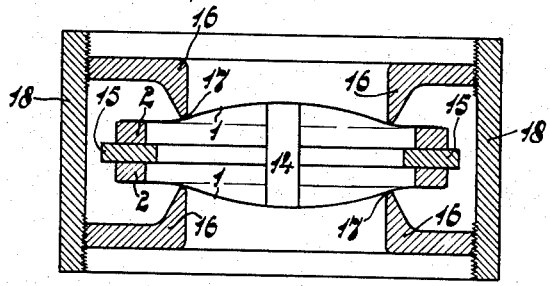

In the drawing:

Fig. 1 shows diagrammatically a first embodiment of the present invention in section, and Figure 2 shows diagrammatically a second embodiment of the invention in section.

Referring now to the drawing, and first to Fig. 1, the device has two thin diaphragms 1, each of which is welded to a supporting ring 2. The central parts of the diaphragms are connected with each other by a rod 9 carrying a weight 8. Each ring 2 is screwed into an annular support 5. These annular supports 5 form a groove enclosed by two cylindrical walls. The outer wall is provided with a screw thread 11 engaging a screw thread 10 of a cylindrical housing 12. The inner wall forms a second support for the diaphragm 1.

A device of this kind may, for example, be used for acceleration measurements, the relative movements of the mass being a function of the acceleration. This movement may be transmitted by mechanical or electrical means.

The radial tension of each diaphragm may be adjusted by screwing the rings 2 inwardly or outwardly in the supports 5. The annular supports 5 themselves can be also screwed inwardly or outwardly in the tube 12, which provides for an additional pretensioning and for an extraordinary stability of the zero position.

As the diaphragms may be made extremely thin, their masses are comparatively negligible relatively to the weight 8, so that the natural frequency $f_o$ of the oscillatable part is given by $$f_o = \sqrt{\frac{D}{m}}$$

D being the tension of the diaphragms and $m$ the mass of the weight 8. As the sensitivity $\alpha$ to accelerations is $$\alpha = \frac{m}{D}$$

there follows:

$$\alpha = \frac{1}{f_o^2}$$

By suitable adjustment of the radial and axial forces acting on the diaphragm, high natural frequencies or sensitivities at a definite zero position can be obtained at will.

Fig. 2 shows an oscillating device, provided with two diaphragms, which has a high sensitivity combined with an extremely well defined zero position. The diaphragms 1 are welded to rings 2, but the latter do not have external screw threads. The diaphragms 1 are spaced apart by a distance piece 14 and the rings 2 by an additional ring 15. Two annular supports 16 are provided with an external screw thread and an internal cylindrical part 17. The annular supports 16 are screwed into a cylindrical housing 18 and their relative positions may be changed by screwing them in or out.

Each diaphragm is thus in contact, by an annular surface, with one of the cylindrical parts 17. The diaphragms are pressed toward each other by the parts 17, while they are held apart by the additional ring 15 and the distance piece 14. The natural frequency, the sensitiveness and the stability of the zero position of this oscillatory device can be adjusted by the dimensioning of the distance piece 14 and the thickness of the additional ring 15, as well as by the relative position of the annular supports 16.

It will be understood that the additional ring 15 may be omitted, provided the thickness of the rings 2 is selected correspondingly.

In the described embodiments, the diaphragms 1 are welded to the rings 2. However, other means of securing the diaphragms 1, may be used. For example, the diaphragms may be riveted or pressed into a groove in the rings 2.

The diaphragms may also be secured to a suitably shaped part with a circular opening. However, annular diaphragm supports are most suitable.

I claim:

1. An oscillatory diaphragm device comprising a housing, at least two diaphragms arranged opposite to each other in spaced relationship in said housing, each of said diaphragms being firmly secured to a first supporting member having a central opening, an annular second support for each diaphragm, said annular second supports contacting the respective diaphragms within said central openings of the first supporting members and being axially displaceable within said housing with respect to said first supporting members so as to adjust the tension of said diaphragms, and a member disposed between the central parts of opposite diaphragms forcing said parts in a direction opposite to the direction of the force exerted by said second supports.

2. An oscillatory diaphragm device comprising a housing, at least two diaphragms arranged opposite to each other in spaced relationship in said housing, each of said diaphragms being firmly secured to a first supporting member having a central opening, an annular second support for each diaphragm, said annular second supports contacting the respective diaphragms within said central openings of the first supporting members and being axially displaceable within said housing with respect to said first supporting members so as to adjust the tension of said diaphragms, and a rod connecting the central parts of opposite diaphragms forcing said parts in a direction opposite to the direction of the force exerted by said second supports.

3. An oscillatory diaphragm device as claimed in claim 2 comprising a weight member disposed on said rod centrally between said diaphragms.

4. An oscillatory diaphragm device comprising a housing, two diaphragms arranged opposite to each other in spaced relationship in said housing, each of said diaphragms being firmly secured to a first supporting member having a central opening, an annular second support for each diaphragm, said annular second supports contacting the respective diaphragms within said central openings of the first supporting members and being axially displaceable within said housing with respect to said first supporting members so as to adjust the tension of said diaphragms, and a member disposed between the central parts of opposite diaphragms and curving said parts in opposite directions with respect to each other, the direction of said curving in each diaphragm being opposite to the direction of the force exerted by said second support.

5. An oscillatory diaphragm device comprising a cylindrical housing provided with an internal screw thread, two diaphragms extending transversely in said housing in opposite spaced relationship, each of said diaphragms being welded with its periphery to a ring, an annular support for each diaphragm having an external thread engaging said internal thread of the housing for axial displacement with respect to said diaphragms, said supports contacting said diaphragms in a circle located between said ring and the center of the diaphragm, and a member disposed between the central parts of said opposite diaphragms and forcing said parts into a direction opposite to the direction of the force exerted by said supports, said forces being controlled by the axial adjustment of said supports.

References Cited in the file of this patent

UNITED STATES PATENTS

| Number | Name | Date |
|---|---|---|
| 1,595,225 | Coffin | Aug. 10, 1926 |
| 1,895,591 | Spencer | Jan. 31, 1933 |
| 2,210,970 | Bonell | Aug. 13, 1940 |
| 2,219,037 | Street | Oct. 22, 1940 |
| 2,332,994 | Draper | Oct. 26, 1943 |
| 2,440,605 | Hathaway | Apr. 27, 1948 |
| 2,504,644 | Burmist | Apr. 18, 1950 |
| 2,570,672 | Hathaway | Oct. 9, 1951 |